(12) United States Patent
Li et al.

(10) Patent No.: US 11,686,075 B2
(45) Date of Patent: Jun. 27, 2023

(54) LUMINOUS WATER OUTLET DEVICE

(71) Applicant: XIAMEN DELMEI SANITARY WARE CO., LTD., Xiamen (CN)

(72) Inventors: Wenjun Li, Nanping (CN); Weilong Luo, Quanzhou (CN); Chunhua Wang, Xiamen (CN)

(73) Assignee: XIAMEN DELMEI SANITARY WARE CO., LTD., Xiamen (CN)

( * ) Notice: Subject to any disclaimer, the term of this patent is extended or adjusted under 35 U.S.C. 154(b) by 59 days.

(21) Appl. No.: 17/385,953

(22) Filed: Jul. 27, 2021

(65) Prior Publication Data

US 2023/0003008 A1 Jan. 5, 2023

(30) Foreign Application Priority Data

Jul. 2, 2021 (CN) .......................... 202121506280.5

(51) Int. Cl.
*E03C 1/04* (2006.01)
*F21S 9/04* (2006.01)
*F21V 33/00* (2006.01)

(52) U.S. Cl.
CPC ............ *E03C 1/0404* (2013.01); *F21S 9/046* (2013.01); *F21V 33/004* (2013.01); *E03C 2001/0418* (2013.01); *Y10T 137/9464* (2015.04)

(58) Field of Classification Search
CPC ... F03B 13/00; H02K 7/1823; H02K 11/0094; F05B 2220/7064; F05B 2260/42; E21S 9/046; E03C 1/04; E03C 1/0404; E03C 2001/0418; F21V 33/004; Y10T 137/9464
See application file for complete search history.

(56) References Cited

U.S. PATENT DOCUMENTS

| | | | | |
|---|---|---|---|---|
| 4,749,126 A * | 6/1988 | Kessener | ............. | F21V 33/004 239/18 |
| 6,439,472 B1 * | 8/2002 | Lin | ......................... | F21S 9/02 239/18 |
| 7,252,431 B1 * | 8/2007 | Caramanna | ............. | G01K 1/14 374/208 |
| 2004/0258567 A1 * | 12/2004 | Kokin | .................. | F21V 33/004 422/68.1 |
| 2005/0276035 A1 * | 12/2005 | Currie | .................. | F21V 33/004 362/96 |
| 2008/0205034 A1 * | 8/2008 | Kunkel | .................... | E03C 1/04 362/101 |

(Continued)

*Primary Examiner* — Daphne M Barry

(57) ABSTRACT

The present disclosure provides a luminous water outlet device, which includes a hydroelectric power generation module, a waterway separation body, a waterway switching module, a water outlet panel, and a light board. The hydroelectric power generation module is arranged at a water inlet, the waterway separation body has two waterways, the waterway switching module is used to switch a flow of water in the two waterways, and the water outlet panel is correspondingly arranged below the two waterways, the light board is electrically connected with the hydroelectric power generation module. Compared with the prior art, the hydroelectric power generation module is arranged in the water inlet to ensure that the light board works no matter which waterway is opened and allows water to flow through. Further, the present disclosure has simpler installation, smaller volume, and simpler waterway structure.

13 Claims, 8 Drawing Sheets

(56) References Cited

U.S. PATENT DOCUMENTS

| | | | |
|---|---|---|---|
| 2008/0271795 A1* | 11/2008 | Buhlmann | E03C 1/0404 |
| | | | 137/551 |
| 2009/0289577 A1* | 11/2009 | Thursfield | E03C 1/14 |
| | | | 362/101 |
| 2010/0012208 A1* | 1/2010 | Chuang | F16K 21/00 |
| | | | 137/801 |
| 2011/0071698 A1* | 3/2011 | Glasser | H02K 7/1823 |
| | | | 250/214 AL |
| 2012/0104114 A1* | 5/2012 | Zhou | B05B 12/004 |
| | | | 239/71 |
| 2014/0101844 A1* | 4/2014 | Wawrla | E03C 1/0404 |
| | | | 4/675 |
| 2016/0215482 A1* | 7/2016 | Fourman | E03C 1/0404 |
| 2018/0058050 A1* | 3/2018 | Wu | G01F 15/06 |
| 2018/0128439 A1* | 5/2018 | Bruls | B05B 17/08 |
| 2018/0306430 A1* | 10/2018 | Weaver | F21S 9/046 |

* cited by examiner

# LUMINOUS WATER OUTLET DEVICE

CROSS-REFERENCE TO RELATED APPLICATIONS

This application is based upon and claims priority to Chinese Patent Application No. 202121506280.5, filed on Jul. 2, 2021, the entire content of which are incorporated herein by reference.

TECHNICAL FIELD

The present disclosure relates to the technical field of sanitary fixtures, in particular to a luminous water outlet device.

BACKGROUND

Faucets or showers are very frequently used products in daily life. In order to meet the needs of users in different application scenarios and improve user experience, some faucets use water flow to generate electricity as a luminous power source, which achieves energy savings, lighting, and other functions at the same time, have appeared on the market. However, existing faucets with light-emitting function often have a hydroelectric power generation device installed near a lower end of the faucet and near a water outlet port. The light-emitting function can only be realized when the faucet is switched to certain waterway, and the light does not work when the faucet is switched to other waterway. Moreover, the additional power generation and light-emitting devices at the water outlet end of the faucet squeeze design space of the waterway at the water outlet, increasing production difficulty and assembly, and make the overall appearance of the faucet look very cumbersome, which has many disadvantages.

SUMMARY

The present disclosure aims to overcome the drawbacks of the prior art and provide a luminous water outlet device.

In order to achieve the above objectives, the present disclosure provides the following technical solutions.

A luminous water outlet device includes a hydroelectric power generation module, a waterway separation body, a waterway switching module, a water outlet panel, and a light board.

The hydroelectric power generation module is arranged at a water inlet, the waterway separation body has two waterways, the waterway switching module is used to switch a flow of water in the two waterways, and the water outlet panel is correspondingly arranged below the two waterways. The light board is electrically connected with the hydroelectric power generation module.

Further, the luminous water outlet device further includes a connector, the waterway separation body includes an upper connecting portion, a waterway separation chamber, and a lower connecting portion. A first end of the connector is a water inlet port, and a second end of the connector is connected to the upper connecting portion. The hydroelectric power generation module is arranged in a chamber jointly formed by the connector and the upper connecting portion.

Further, the hydraulic power generation module includes an impeller chamber for accommodating an impeller and a generator chamber for accommodating an electric generator. A shaft of the electric generator is connected to a center of the impeller. An upper end of the impeller chamber is closed, and a sidewall of the impeller chamber is provided with slanting water inlet ports. The water first flows into the impeller chamber, then the water flows out from water passing holes on both sides of an upper end of the generator chamber. Afterwards, the water flows along a first gap between a sidewall of the generator chamber and a sidewall of the upper connecting portion, and along a second gap between a sidewall of the connector and the sidewall of the upper connecting portion. Then, the water flows into the waterway separation chamber from a water passing hole provided on a bottom surface of the upper connecting portion.

Further, a first end of the waterway switching module is connected to an external press button, and a second end of the waterway switching module is arranged inside the waterway separation chamber. The waterway switching module moves laterally by pressing the external press button to switch the flow of water in the two waterways.

Further, the bottom surface of the upper connecting portion of the waterway separation body is provided with a first wiring hole, a lead wire of the electric generator is drawn out from the first wiring hole, and an upper wall of the lower connecting portion of the waterway separation body is provided with a second wiring hole. The lead wire of the electric generator passes through the second wiring hole and is connected to the light board. The first wiring hole and the second wiring hole are respectively provided with a waterproof silicone sealing member.

Further, the waterway separation chamber includes a middle waterway, a side waterway, and a chamber communicating the middle waterway and the side waterway. The waterway switching module includes a hollow cylindrical plugging block with an end closed and an end open, a sliding rod, and a fixed rod. The plugging block is arranged inside the chamber communicating the middle waterway and the side waterway in a watertight manner with the closed end faced outward. A first end of the sliding rod is connected to the press button, and a second end of the sliding rod is located in an inner side of the closed end of the plugging block. The second end of the sliding rod is slidably connected to the fixed rod arranged on a sidewall of the chamber communicating the middle waterway and the side waterway to realize a lateral movement.

Further, the second end of the sliding rod located in the inner side of the closed end of the plugging block is provided with a sliding fork, an outer sidewall of the sliding fork is provided with a first sealing member, and the inner side of the closed end of the plugging block is provided with a second sealing member. The first sealing member, the second sealing member, the plugging block, and the sliding rod jointly achieve a watertight effect. Under a condition where the sliding rod moves toward a left side to separate the sliding fork with the fixed rod, the open end of the plugging block is then sealed by the first sealing member, and at the same time the side waterway is unblocked and opened. Under a condition where the sliding rod moves toward the right side to insert the fixed rod into the sliding fork, the first sealing member moves accordingly and an entrance of the side waterway is then sealed, and at the same time the middle waterway is unblocked and opened. The water flows out from a through hole on a sidewall of the plugging block located between the first sealing member and the second sealing member.

Further, the lower connecting portion of the waterway separation body includes a middle water outlet and a peripheral water outlet. The middle water outlet communicates with the middle waterway, the peripheral water outlet communicates with the side waterway. The water outlet panel is made of a light-transmitting material. A water outlet surface of the water outlet panel is arc-shaped and concaved, and a middle of an inner side of the water outlet panel is provided with a retaining ring matching a sidewall of the middle water outlet. A sidewall of the peripheral water outlet is connected to an outer sidewall of the water outlet panel in a quick coupling manner, and the sidewall of the middle water outlet is inserted into the retaining ring. The light board is arranged on an upper wall of the lower connecting portion of the waterway separation body, and the light board is located between the sidewall of the middle water outlet and the sidewall of the peripheral water outlet.

According to another aspect of the present disclosure, a pull-out luminous faucet is provided, which includes the luminous water outlet device as described above.

According to yet another aspect of the present disclosure, a luminous spring faucet is provided, which includes the luminous water outlet device as described above.

The beneficial effects of the present disclosure is described as follows.

In the present disclosure, the hydroelectric power generation module is arranged in the water inlet to ensure that the light board works no matter which waterway is opened and allows water to flow through. Further, the present disclosure has simpler installation, smaller volume, and simpler waterway structure.

Figure 1:
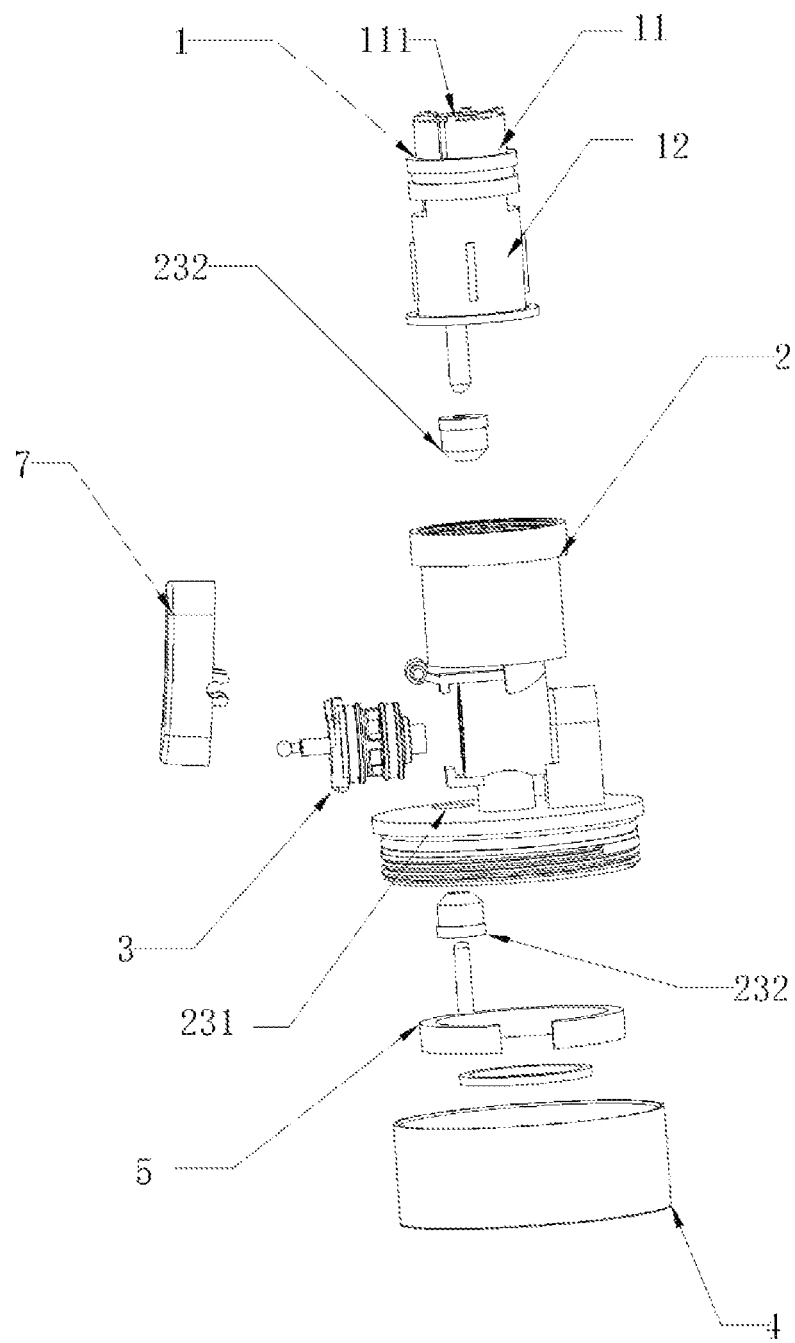
FIG. 1 is an exploded view of a luminous water outlet device according to one embodiment of the present disclosure.
Figure 2:
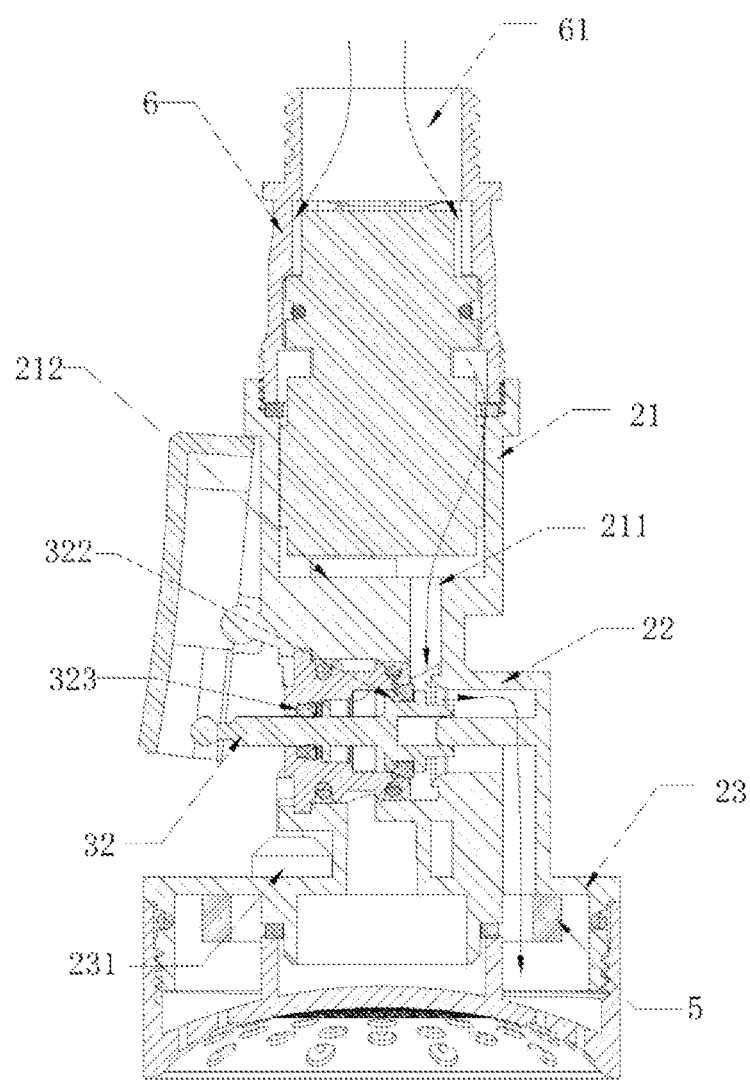
FIG. 2 is a cross-sectional view of the luminous water outlet device according to one embodiment of the present disclosure, which shows that a side waterway is opened.
Figure 3:
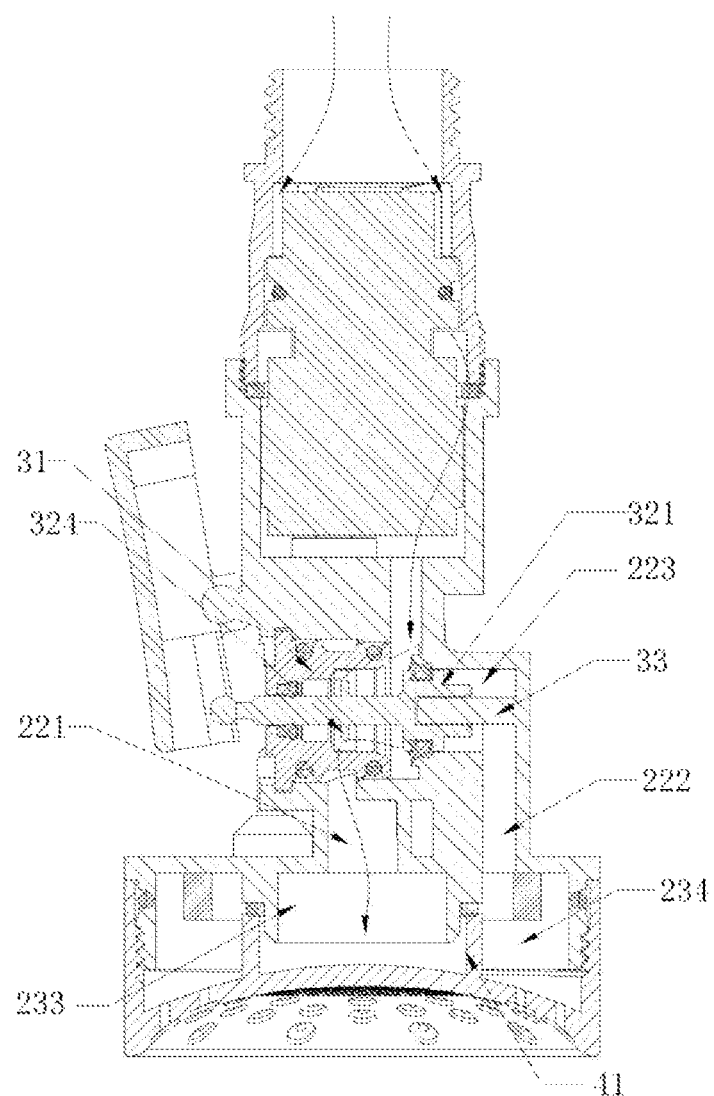
FIG. 3 is a cross-sectional view of the luminous water outlet device according to one embodiment of the present disclosure, which shows that a middle waterway is opened.

Description of reference designations: 1—hydroelectric power generation module, 11—impeller chamber, 110—slanting water inlet port, 111—upper end of impeller chamber, 12—generator chamber, 121—water passing hole, 122—electric generator, 123—first gap, 2—waterway separation body, 21—upper connecting portion, 212—first wiring hole, 211—water passing hole, 22—waterway separation chamber, 221—middle waterway, 222—side waterway, 223—chamber, 23—lower connecting portion, 231—second wiring hole, 232—waterproof silicone sealing member, 233—middle water outlet, 234—peripheral water outlet, 3—waterway switching module, 31—plugging block, 32—sliding rod, 321—sliding fork, 322—first sealing member, 323—second sealing member, 324—stopper, 33—fixed rod, 4—water outlet panel, 41—retaining ring, 5—light board, 51—light guide plate, 6—connector, 61—water inlet, 7—press button, 801—electric energy storage unit, 802—temperature sensor, 803—control module, 804—display panel.

The realization of the objectives, functional characteristics, and advantages of the present disclosure will be further explained in conjunction with the embodiments and with reference to the accompanying drawings.

DETAILED DESCRIPTION OF THE EMBODIMENTS

In order to make the objectives, technical solutions, and advantages of the embodiments of the present disclosure clearer, the technical solutions of the embodiments of the present disclosure will be described clearly and completely below with reference to the drawings of the embodiments of the present disclosure. Obviously, the described embodiments are parts of, but not all of, the embodiments of the present disclosure. Based on the embodiments of the present disclosure, all other embodiments derived by those of ordinary skills in the art without creative effort fall within the scope of protection of the present disclosure. Accordingly, the following detailed description of the embodiments of the present disclosure shown in the drawings is not intended to limit the scope of protection of the present disclosure, but merely to represent selected embodiments of the present disclosure. Based on the embodiments of the present disclosure, all other embodiments derived by those of ordinary skills in the art without creative effort fall within the scope of protection of the present disclosure.

In the description of the present disclosure, the terms "first", "second" are used only for descriptive purposes and cannot be understood as indicating or implying relative importance or implying the number of indicated technical features. Thus, a characteristic that is referred to by "first" and "second" may include, expressly or implicitly, one or more of the characteristics. Also, it should be noted that the terms of "up", "down", "inside/inner", "outside/outer", "front end", "rear end", "two ends", "one end", "another end", "one side", "another side" for indicating the location or orientation are based on the location or orientation shown in the drawings for the sake of simplifying the description of the present disclosure, rather than indicate or imply that the indicated device or component must have specific location or orientation, or be constructed and operated by specific orientation. These terms should not be understood as limits to the present disclosure.

In the description of the present disclosure, it should be noted that, unless otherwise clearly defined, the terms "provide/arrange", "connect", etc. should be understood in a broad sense. For example, "connect" may be interpreted as a fixed connection, a detachable connection, or an integrated connection, it may also be interpreted as a mechanical connection or an electrical connection, or a direct connection or an indirect connection through an intermediate medium. Optionally, it may refer to the communication of two components. For those of ordinary skill in the art, the meaning of the above-mentioned terms in the present disclosure should be understood under specific circumstances.

The content of the present disclosure will be described in detail below in terms of the embodiments.

Referring to FIGS. 1-8, embodiments of the present disclosure are described below. A luminous water outlet device includes a hydroelectric power generation module 1, a waterway separation body 2, a waterway switching module 3, a water outlet panel 4, and a light board 5. The hydroelectric power generation module 1 is arranged at a water inlet, the waterway separation body 2 has two waterways, the waterway switching module 3 is used to switch a flow of water in the two waterways, and the water outlet panel 4 is correspondingly arranged below the two waterways. The light board 5 is electrically connected with the hydroelectric power generation module 1. According to an embodiment of the present disclosure, the light board 5 may be arranged at a position near the water outlet panel 4 or on the housing of the water outlet device. Hydroelectric power generation module 1 is provided in the water inlet to make ensure that the light board works no matter which waterway is opened and allows water to flow through. The light board 5 is arranged at the position near the water outlet panel 4 makes sure that the light my sufficiently fall on the water outlet panel 4. Alternatively, the light board 5 arranged on the housing of the water outlet device can also ensure that the light path will not be blocked by other structures. This design not only has a simpler structure, but also may prevent the light path from being blocked by other structures and ensures the brightness of light at the outlet.

Further, the luminous water outlet device further includes a connector 6, the waterway separation body 2 includes an upper connecting portion 21, a waterway separation chamber 22, and a lower connecting portion 23. A first end of the connector 6 is a water inlet port 61, and a second end of the connector 6 is connected to the upper connecting portion 21. The hydroelectric power generation module 1 is arranged in a chamber jointly formed by the connector 6 and the upper connecting portion 21. Specifically, the connection manner of the connector 6 and the upper connecting portion 21 may be a snap connection, a threaded connection, etc., and a sealing ring is provided at the connection joint to ensure the sealing performance.

Figure 4:
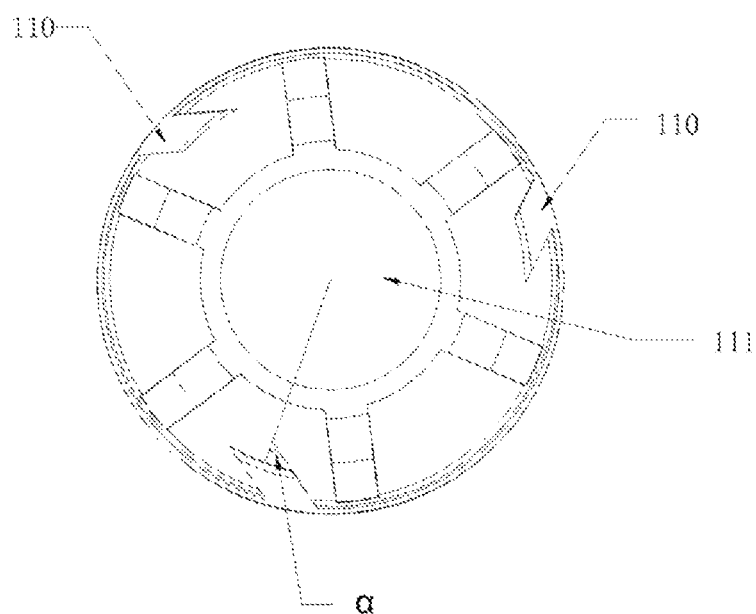
FIG. 4 is a top view of an impeller chamber of the luminous water outlet device according to one embodiment of the present disclosure.
Figure 5:
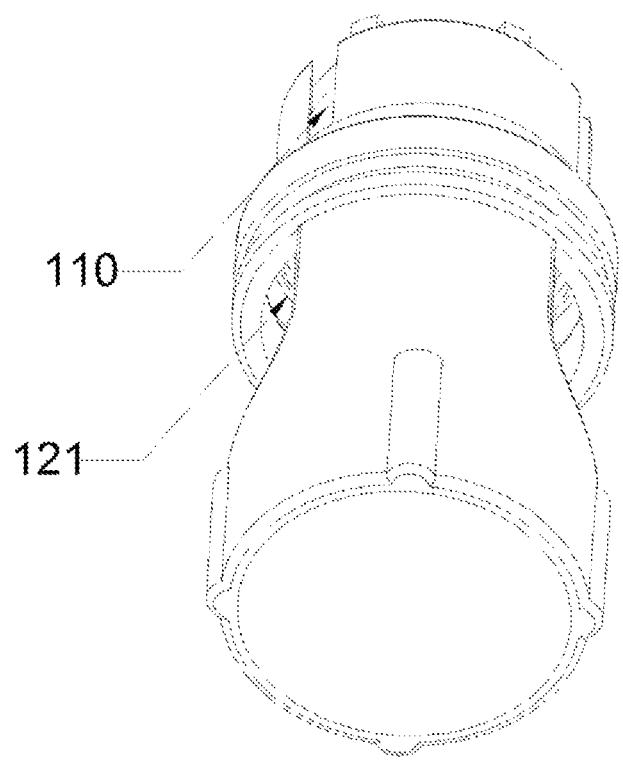
FIG. 5 is a perspective view of a hydroelectric power generation module of the luminous water outlet device according to one embodiment of the present disclosure.
Figure 6:
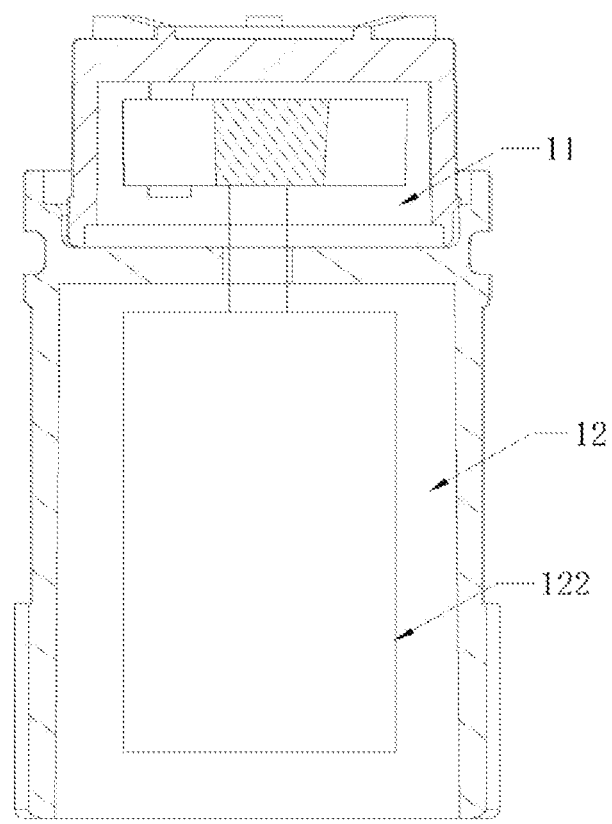
FIG. 6 is a cross-sectional view of the hydroelectric power generation module of the luminous water outlet device according to one embodiment of the present disclosure.
Figure 7:
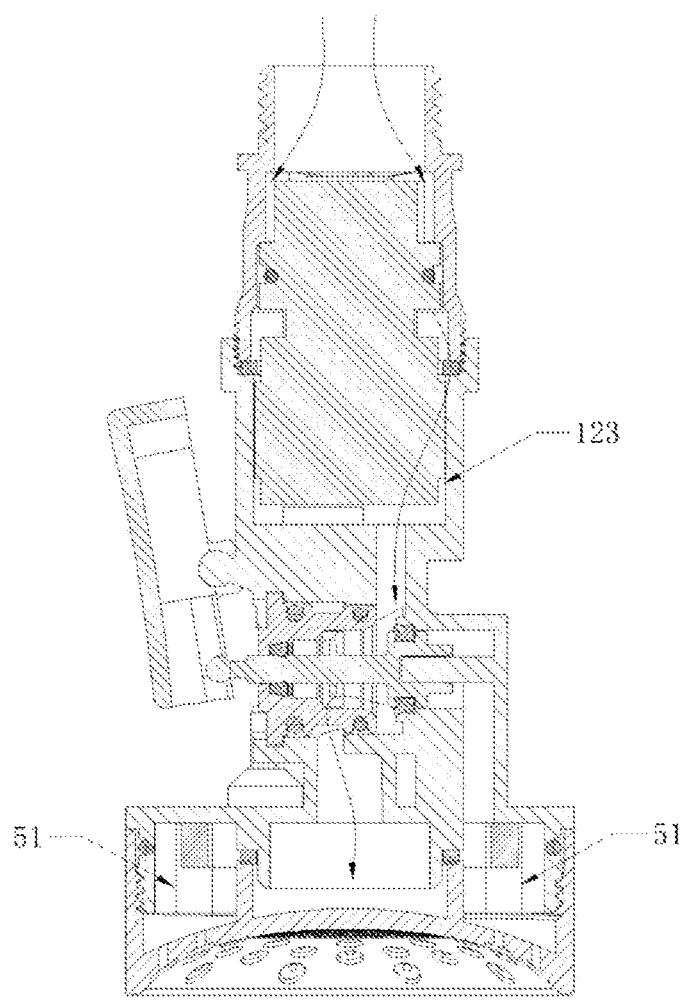
FIG. 7 is a cross-sectional view of a luminous water outlet device according to another embodiment of the present disclosure.
Figure 8:
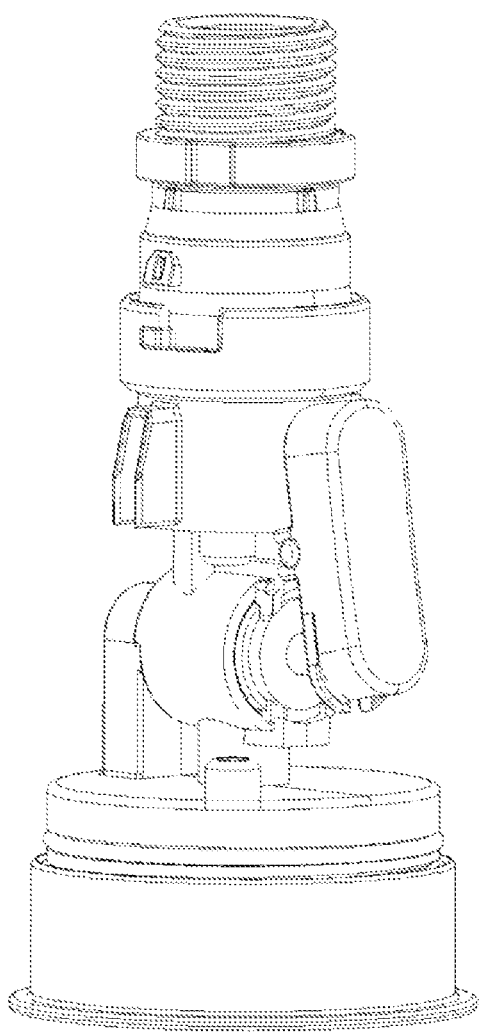
FIG. 8 is an assembling schematic diagram of a luminous water outlet device according to yet another embodiment of the present disclosure.
Figure 9:
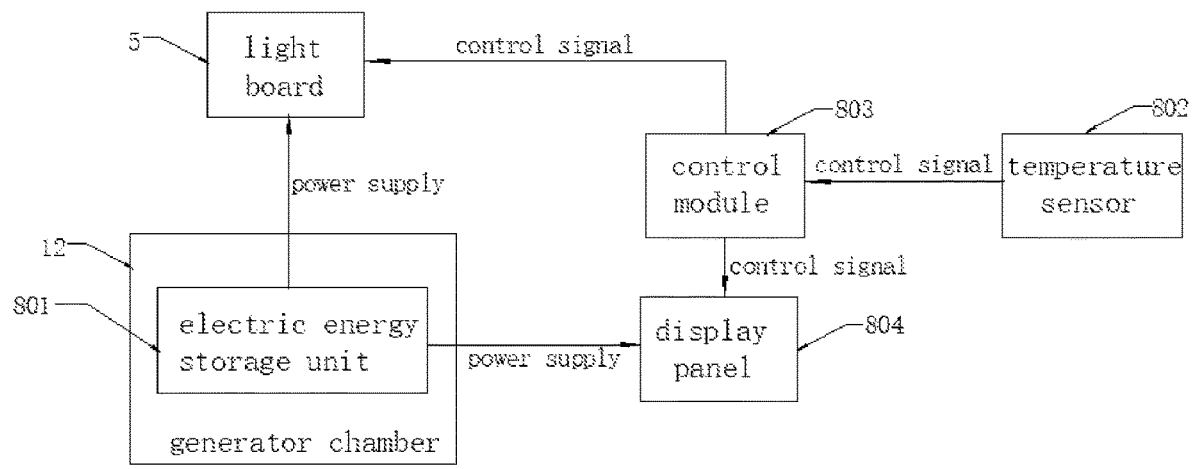
FIG. 9 is a schematic diagram showing some of the components of a luminous water outlet device according to still another embodiment of the present disclosure.

Further, the hydraulic power generation module 1 includes an impeller chamber 11 for accommodating an impeller and a generator chamber 12 for accommodating an electric generator 122. A shaft of the electric generator is connected to a center of the impeller. An upper end 111 of the impeller chamber 11 is closed, and a sidewall of the impeller chamber 11 is provided with slanting water inlet ports 110. The water flows into the impeller chamber 11, then the water flows out from water passing holes 121 on two sides of an upper end of the generator chamber 12. Afterwards, the water flows along a first gap 123 between a sidewall of the generator chamber 12 and a sidewall of the upper connecting portion 21, and along a second gap between a sidewall of the connector 6 and the sidewall of the upper connecting portion 21. Then, the water flows into the waterway separation chamber 22 from a water passing hole 211 provided on a bottom surface of the upper connecting portion 21. Water entering the water inlet of the connector 6 does not directly impact the impeller, but rather flows through the gap between the impeller chamber 11 and the connector 6, then flows into the impeller chamber 11 via slanting water inlet ports 110 to impact the impeller for power generation. This design can increase the impact force of the water flow on the impeller by increasing the water pressure, thereby increasing the power generation efficiency. There may be multiple slanting water inlet ports 110. In this embodiment, there are three slanting water inlet ports, which are evenly arranged around the impeller. In addition, the angle α of the slanting water inlet port 110 (as shown in FIG. 4) is defined as the angle between the line connecting the center of the slanting water inlet port and the center of the top of the impeller chamber and the slanting direction. Preferably, the angle α of the slanting water inlet port 110 falling within the range of 30-90° may ensure that the water obliquely enters the impeller chamber 11 has a larger contact area with the impeller blades, thereby improving the efficiency of power generation. Further, a plurality of upwardly protruding ribs may be arranged on the outer sidewall of the top of the impeller chamber 11, and the arrangement of the ribs can prevent the water inlet surface from being blocked during the installation and assembly process, and ensure that there is an enough space for water flowing.

Further, a first end of the waterway switching module 3 is connected to an external press button 7, and a second end of the waterway switching module 3 is arranged inside the waterway separation chamber 22. The waterway switching module 3 moves laterally by pressing the external press button 7 to switch the flow of water in the two waterways.

Further, the bottom surface of the upper connecting portion 21 of the waterway separation body 2 is provided with a first wiring hole 212, a lead wire of the electric generator is drawn out from the first wiring hole 212, and an upper wall of the lower connecting portion 23 of the waterway separation body 2 is provided with a second wiring hole 231. The lead wire of the electric generator passes through the second wiring hole 231 and is connected to the light board 5. The first wiring hole 212 and the second wiring hole 231 are respectively provided with a waterproof silicone sealing member 232. The design of arranging the wiring of the generator in the outside without the need to pass through the water body not only reduces the difficulty of sealing, but also improves the safety level, and the structure is also more concise and reasonable.

Further, the waterway separation chamber 22 includes a middle waterway 221, a side waterway 222, and a chamber 223 communicating the middle waterway 221 and the side waterway 222. The waterway switching module 3 includes a hollow cylindrical plugging block 31 with an end closed and an end open, a sliding rod 32, and a fixed rod 33. The plugging block 31 is arranged inside the chamber 223 communicating the middle waterway 221 and the side waterway 222 in a watertight manner with the closed end faced outward. Specifically, the outer sidewall of the plugging block 31 may be provided with a sealing ring matching with the chamber 223 for sealing. A first end of the sliding rod 32 is connected to the press button 7, and a second end of the sliding rod 32 is located in an inner side of the closed end of the plugging block 31. The second end of the sliding rod 32 is slidably connected to the fixed rod 33 arranged on a sidewall of the chamber 223 communicating the middle waterway 221 and the side waterway 222 to realize a lateral movement.

Further, the second end of the sliding rod 32 located in the inner side of the closed end of the plugging block 31 is provided with a sliding fork 321, an outer sidewall of the sliding fork 321 is provided with a first sealing member 322, and the inner side of the closed end of the plugging block 31 is provided with a second sealing member 323. The first sealing member 322, the second sealing member 323, the plugging block 31, and the sliding rod 32 jointly achieve a watertight effect. The outer sidewall of the sliding rod 32 at the left side of the sliding fork 321 may further be provided with a stopper 324. The stopper 324 is used for limiting the position when the sliding rod 32 moves leftward. Under a condition where the sliding rod 32 moves toward a left side to separate the sliding fork 321 with the fixed rod 33, the open end of the plugging block 31 is then sealed by the first sealing member 322, and at the same time the side waterway 222 is unblocked and opened. Under a condition where the sliding rod 32 moves toward the right side to insert the fixed rod 33 into the sliding fork 321, the first sealing member 322 moves accordingly and an entrance of the side waterway 222 is then sealed, and at the same time the middle waterway 221 is unblocked and opened. The water flows out from a through hole on a sidewall of the plugging block 31 located between the first sealing member 322 and the second sealing member 323.

Further, the lower connecting portion 23 of the waterway separation body 2 includes a middle water outlet 233 and a peripheral water outlet 234. The middle water outlet 233 communicates with the middle waterway 221, and the peripheral water outlet 234 communicates with the side waterway 222. The water outlet panel 4 is made of a light-transmitting material. The water outlet surface of the water outlet panel 4 is arc-shaped and concaved. The inner side of the middle part is provided with a retaining ring 41 matching with the sidewall of the middle water outlet 233. The sidewall of the peripheral water outlet 234 and the outer sidewall of the water outlet panel 4 are connected in a quick coupling manner. Specifically, the means of the quick coupling manner may be threaded fit, snap fit, interference fit, etc. The water outlet surface within the retaining ring 41 is provided with densely distributed water outlet holes, and the water outlet surface corresponding to the peripheral water outlet 234 outside the retaining ring 41 is provided with relatively less water outlet holes. Therefore, by switching to different waterway, different way of water outlet can be realized. Optionally, the water outlet holes provided on the water outlet surface within the retaining ring 41 may be triangular prism-shaped, and the water outlet holes outside the retaining ring 41 may be cylindrical. The retaining ring 41 is sealed and fitted with the sidewall of the middle water outlet 233, and the light board 5 is arranged on the upper wall of the lower connecting portion 23 of the waterway separation body 2 and is located between the sidewall of the middle water outlet 233 and sidewall of the peripheral water outlet 234. By doing so, when the middle waterway is opened and allows water to flow through, the light of the light board arranged on the peripheral waterway can be refracted through the light-transmitting material without being blocked by the water body, thereby increasing the brightness of the lighting. Specifically, the light board 5 may be a ring-shaped LED light board. By connecting the water outlet panel 4 and the lower connecting portion 23 of the waterway separation body 2 in a quick coupling manner, not only the structure is simpler, but also the assembling is convenient. The user can remove the water outlet panel during use. Not only can the shower type water outlet be changed to a centralized water outlet according to the needs, which improves the flexibility of use, but also facilitates the user to check and replace when the light board fails. The connection joints between the water outlet panel 4 and the lower connecting portion 23 of the waterway separation body 2 are respectively provided with a sealing ring to ensure the sealing performance of the water outlet device. Optionally, light guide plates 51 extending downward may be provided on two sides of the light board to reduce the light shielding by the water body when the side waterway 222 is opened, thereby increasing the brightness of illumination. The luminous water outlet device of the present disclosure provides electric energy to the light board at the water outlet through the hydroelectric power generation module arranged at the water inlet, and not only realizes the lighting function, but also may indicating the water flow rate through the intensity of the light.

Further, according to another embodiment of the present disclosure, an electric energy storage unit 801 may be provided in the generator chamber 12, which is used to store excess electric energy when the water flow rate is relatively higher to compensate for the electric energy required for supplying the light board 5 when the water flow rate is relatively lower. By doing so, no matter the water flow rate is high or low, the brightness of the light board 5 may be maintained at a preset level. Furthermore, a temperature sensor 802 may be provided on the lower connecting portion 23 to sense the temperature of the water flow and feed the temperature information back to the control module 803 to control the light board 5 to emit light of different colors. For example, the light may be set to be green when the temperature is 0-30° C., blue when the temperature is 30-50° C., and red when the temperature is above 50° C. Optionally, a display panel 804 may also be provided on the press button 7, and the display panel 804 is connected to the electric energy storage unit 801 and the control module 803 for displaying the specific temperature of the water flow.

The luminous water outlet device of the present disclosure may be applied to various products such as showers, sprinklers, faucets, pull-out faucets, spring faucets, and so on. When the luminous water outlet device is applied to a pull-out faucet or a spring faucet, the luminous water outlet device may be further covered by a housing, and the water inlet 61 may be connected to the nozzle of the pull-out faucet or the nozzle of the spring faucet.

The implementations in the above embodiments may be further combined or replaced, and the embodiments merely describe the preferred embodiments of the present disclosure, without limiting the concept and scope of the present disclosure. All the changes and improvements made by those of ordinary skill in the art to the technical solution of the present disclosure without departing from the design concept of the present disclosure fall within the protection scope of the present disclosure.

What is claimed is:

1. A luminous water outlet device, comprising a hydroelectric power generation module, a waterway separation body, a waterway switching module, a water outlet panel, and a light board;
    wherein the waterway separation body has a waterway separation chamber and a lower connecting portion, the waterway separation chamber has tow waterways, a middle waterway and a side waterway, the lower connecting portion has a middle water outlet and a peripheral water outlet, the middle water outlet communicates with the middle waterway, the peripheral water outlet communicates with the side waterway, and the light board is located between a sidewall of the middle water outlet and a sidewall of the peripheral water outlet;
    the hydroelectric power generation module is arranged at a water inlet, the waterway switching module is used to switch a flow of water in the two waterways, and the water outlet panel is correspondingly arranged below the two waterways, the light board is electrically connected with the hydroelectric power generation module.

2. The luminous water outlet device according to claim 1 further comprising a connector, wherein the waterway separation body further includes an upper connecting portion, a first end of the connector is a water inlet port, and a second end of the connector is connected to the upper connecting portion, the hydroelectric power generation module is arranged in a chamber jointly formed by the connector and the upper connecting portion.

3. The luminous water outlet device according to claim 2, wherein the hydraulic power generation module comprises an impeller chamber for accommodating an impeller and a generator chamber for accommodating an electric generator; a shaft of the electric generator is connected to a center of the impeller, an upper end of the impeller chamber is closed, and a sidewall of the impeller chamber is provided with slanting water inlet ports; the water flows into the impeller chamber, then the water flows out from water passing holes on two sides of an upper end of the generator chamber; afterwards, the water flows along a first gap between a sidewall of the generator chamber and a sidewall of the upper connecting portion, and along a second gap between a sidewall of the connector and the sidewall of the upper connecting portion; then, the water flows into the waterway separation chamber from a water passing hole provided on a bottom surface of the upper connecting portion.

4. The luminous water outlet device according to claim 3, wherein a first end of the waterway switching module is connected to an external press button, and a second end of the waterway switching module is arranged inside the waterway separation chamber, the waterway switching module moves laterally by pressing the external press button to switch the flow of water in the two waterways.

5. The luminous water outlet device according to claim 4, wherein the bottom surface of the upper connecting portion of the waterway separation body is provided with a first wiring hole, a lead wire of the electric generator is drawn out from the first wiring hole, and an upper wall of the lower connecting portion of the waterway separation body is provided with a second wiring hole, the lead wire of the electric generator passes through the second wiring hole and is connected to the light board, the first wiring hole and the second wiring hole are respectively provided with a waterproof silicone sealing member.

6. The luminous water outlet device according to claim 4, wherein the waterway separation chamber further comprises a chamber communicating the middle waterway and the side waterway, the waterway switching module comprises a hollow cylindrical plugging block with a closed end and an open end, a sliding rod, and a fixed rod; the plugging block is arranged inside the chamber communicating the middle waterway and the side waterway in a watertight manner with the closed end faced outward; a first end of the sliding rod is connected to the press button, and a second end of the sliding rod is located in an inner side of the closed end of the plugging block; the second end of the sliding rod is slidably connected to the fixed rod arranged on a sidewall of the chamber communicating the middle waterway and the side waterway to realize a lateral movement.

7. The luminous water outlet device according to claim 6, wherein the second end of the sliding rod located in the inner side of the closed end of the plugging block is provided with a sliding fork, an outer sidewall of the sliding fork is provided with a first sealing member, and the inner side of the closed end of the plugging block is provided with a second sealing member; the first sealing member, the second sealing member, the plugging block, and the sliding rod jointly achieve a watertight effect; under a condition where the sliding rod moves toward a left side to separate the sliding fork with the fixed rod, the open end of the plugging block is sealed by the first sealing member, and at a same time the side waterway is unblocked and opened; under a condition where the sliding rod moves toward the right side to insert the fixed rod into the sliding fork, the first sealing member moves accordingly and an entrance of the side waterway is sealed, and at a same time the middle waterway is unblocked and opened; the water flows out from a through hole on a sidewall of the plugging block located between the first sealing member and the second sealing member.

8. The luminous water outlet device according to claim 6, wherein the water outlet panel is made of a light-transmitting material, a water outlet surface of the water outlet panel is arc-shaped and concaved, and a middle of an inner side of the water outlet panel is provided with a retaining ring matching with a sidewall of the middle water outlet; a sidewall of the peripheral water outlet is connected to an outer sidewall of the water outlet panel in a quick coupling manner, and the sidewall of the middle water outlet is inserted into the retaining ring; the light board is arranged on an upper wall of the lower connecting portion of the waterway separation body.

9. The luminous water outlet device according to claim 4, wherein an electric energy storage unit is provided in the generator chamber, the electric energy storage unit stores excess electric energy when a water flow rate is relatively higher to compensate for the electric energy required for supplying the light board when the water flow rate is relatively lower.

10. The luminous water outlet device according to claim 9, wherein a temperature sensor is provided on the lower connecting portion to sense a temperature of the water flow and feed temperature information to a control module to control the light board to emit light of different colors; a display panel is provided on the external press button, and the display panel is connected to the electric energy storage unit and the control module for displaying the specific temperature of the water flow.

11. A pull-out luminous faucet comprising the luminous water outlet device according to claim 1.

12. The luminous water outlet device according to claim 1, wherein light guide plates extending downward are provided on two sides of the light board.

13. A luminous spring faucet comprising the luminous water outlet device according to claim 1.

\* \* \* \* \*